April 28, 1964

H. H. HAAS 3,130,599

VARIABLE SPEED GOVERNOR CONTROL

Filed June 1, 1959

INVENTOR.
HERBERT H. HAAS
BY
ATTORNEYS

United States Patent Office 3,130,599
Patented Apr. 28, 1964

3,130,599
VARIABLE SPEED GOVERNOR CONTROL
Herbert H. Haas, Royal Oak, Mich., assignor to Continental Aviation and Engineering Corporation, Detroit, Mich., a corporation of Virginia
Filed June 1, 1959, Ser. No. 817,134
4 Claims. (Cl. 74—526)

My invention relates to internal combustion engines and more particularly to the control of variable speed governors therefor.

In the development of internal combustion engines for vehicles requiring variable speed governors, it was discovered that under certain operating conditions governors heretofore do not operate satisfactorily.

For example, a variable speed governor normally operates to sense variable engine loads which tend to produce varying engine speeds when the throttle or fuel control remains at a constant position. The governor actuates the throttle or fuel control relative to such loads to keep engine speed close to a constant value. However, when the vehicle operator changes fuel control position, as in anticipation of changing load conditions when approaching a hill, the governor, sensing that the relative load is not in harmony with the new fuel control position, tends to move the throttle or fuel control to a full open or full closed position for that space of time it takes for the engine to assume the new speed level as established by the fuel control position. Thus, under changing conditions the engine is operated constantly between full and no load which presents a rather undesirable operation.

Generally, conventional variable speed governors are provided with a torque control which trailors the torque over the speed range through which the governor will operate. Within these limits the governor can and does tend to adjust the throttle or fuel control to its highest or lowest settings at each operator-actuated movement of the fuel control.

It is of little consequence if the control moves to its minimum speed position at times, but for sake of economy and efficient operation, it is undesirable for the governor to operate to a maximum every time the throttle or fuel control is adjusted for higher speed.

An object of the present invention is to improve engine control by providing a variable speed range limiting means for a variable speed governor.

Another object of the invention is to improve the operating characteristics of variable speed governors for internal combustion engines by providing a limiting means on maximum speed governor operation relative to fuel or throttle control position.

A further object of the invention is to improve engine operation by controlling engine load directly by the operator to give maximum-minimum speed governor characteristics to a variable speed governor with torque control.

Figure 1:
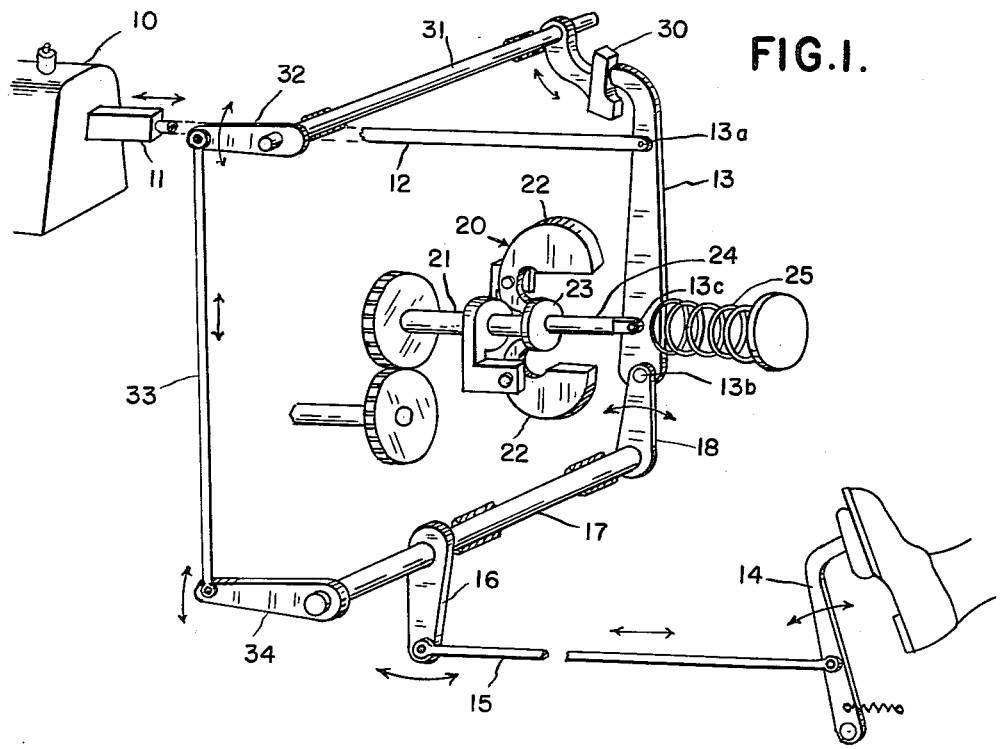
Figure 2:
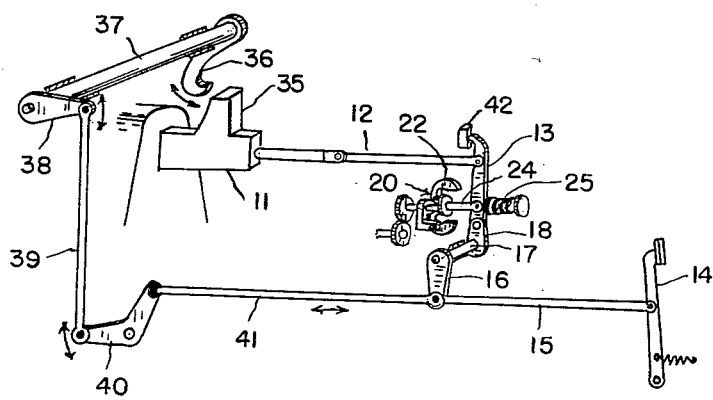

For a more complete understanding of the invention, reference may be had to the accompanying drawing illustrating preferred embodiments of the invention, and in which FIG. 1 is a diagrammatic perspective view of a control mechanism and variable speed governor adapted for fuel control of an internal combustion engine and embodying the present invention, and FIG. 2 is a diagrammatic perspective view of a somewhat similar installation but embodying another preferred modification of the invention.

Conventionally, the speed of an internal combustion engine is controlled by operating a throttle or fuel delivery means, which is illustrated for the present purpose as being a fuel injection pump 10 having, as indicated in FIG. 1, a control rod or rack 11 axially adjustable for varying fuel delivery and, hence, engine speed. As shown, movement of the rack 11 to the left or inward towards the pump 10 increases fuel delivery, while movement to the right or outwardly decreases fuel delivery.

A connecting rod 12 operably connects the rack 11 with a floating yoke or lever 13 at a pivot point 13a. A foot pedal 14 or other operating means preferably operates a rod 15 or other mechanism connected to an arcuately adjustable operating lever 16 connected to a rotatable operating lever shaft 17. The shaft 17 has a lever 18 or other means operably connected as shown to the lever 13 at a pivot point 13b.

A conventional variable speed governor 20 comprises a shaft 21 gear driven from the engine at a speed proportional to engine speed and carrying a pair of flyweights 22 bearing on a sliding sleeve 23 pivotally connected by a rod 24 or other mechanism to the lever 13 at a pivot point 13c intermediate the pivot points 13a and 13b. A governor spring 25 urges the rod 24 toward the flyweights 22.

With the pedal 14 in a selected position, a tendency toward an increase in engine speed caused by reduced load increases centrifugal force on the flyweights 22 causing them to move outward and force the connecting rod 24 to the right against the opposing force of the spring 25. The point 13b is a fulcrum when the pedal 14 retains its position, so that the lever 13 moves clockwise to move the rod 12 and rack 11 to the right, decreasing fuel delivery and hence engine speed.

Conversely, increased load causes engine speed to reduce, the flyweights 22 move inward, the spring 25 forces the lever 13 to move counterclockwise, moving the rod 12 and rack 11 to the left to give greater fuel delivery and increase speed.

Thus, in effect, the governor senses changes in speeds and alters engine load accordingly to maintain within close limits a substantially constant speed. The governor position bears a relationship to the position of the pivot point 13b, and for every such pivot point position, the governor will operate to maintain engine speed in substantial constant conformity.

When the pedal 14 is depressed by the operator, the rod 15 moves to the left, rotating the lever 16, shaft 17 and lever 18 clockwise. If the engine load is constant, the pivot point 13c acts as a fulcrum since the governor flyweights 22 are in a relatively fixed position, and the pivot 13a of the lever 13 thus moves counterclockwise to actuate the rod 12 and rack 11 to the left, increasing fuel delivery and engine load. Conversely, release of the pedal 14 causes opposite motion of the components to reduce engine load.

Conventionally a torque control cam or stop 30 is provided to limit counterclockwise motion of the upper pivot point 13a, thus putting a maximum speed limit on operation of the governor 20. However, it will be apparent that when the pedal 14 is depressed at any time, before the speed of the engine has changed the governor will sense the shift in the pivot point 13b and will tend to control to this point; that is, with the pivot point 13b shifted clockwise, the forces of the governor flyweights 22 and the spring 25 are unbalanced such that the spring exerts a relatively greater force on the lever 13 and thus acts to shift the pivot point 13a to its maximum counterclockwise position, moving the rod 12 and rack 11 to the left to the maximum fuel delivery position. Then, as engine speed picks up, the governor weights 22 exert a greater counterforce against the spring 25, moving the lever 13 clockwise to reduce the fuel delivery to the new setting corresponding to the desired operating position.

Thus, in the conventional variable speed governor-controlled engine, each time the operator depresses the pedal 14, the governor reacts immediately to produce maximum fuel delivery until engine speed picks up sufficiently to permit the operating mechanism to attain its new control position.

So far, all that has been described is conventional.

In the present invention, the torque control cam is operably connected by any suitable means such as a shaft 31, lever 32, rod 33 and lever 34 to the operating lever shaft 17 which is actuated from the foot pedal 14 as previously described. With this arrangement, it will be seen that on depressing the foot pedal 14, the lever 14 will be rotated clockwise to in turn move the lever 32, shaft 31 and stop 30 clockwise. The stop 30 is thus adjustable to a position related directly to the position of the foot pedal 14 to impose a limit on the maximum counterclockwise position to which the governor 20 can actuate the lever 13. The governor is thus unable to produce maximum fuel delivery as in the conventional mechanism, as long as the driver does not move the pedal 14 to its maximum depressed position.

In FIG. 2, a second preferred modification of the invention is illustrated, in which the conventional parts of the mechanism described above are substantially the same, but in this arrangement the rack 11 is provided with an abutting element 35 which has a variable maximum motion to the left, toward the increased fuel delivery position, determined by the position of a variable stop 36 operably connected by means of a shaft 37, lever 38, rod 39, crank 40 and rod 41 to the rod 15 operated by the pedal 14. Depression of the pedal 14 operates the lever 13 in the same fashion as in FIG. 1, and also moves the rod 41 to the left, rotating the crank 40 counterclockwise to actuate the lever 38, shaft 37, and stop 36 clockwise to impose a maximum limit on motion of the rack 11 toward the increased fuel delivery position, so that the governor 20 can not control beyond the position set by the driver. A conventional torque control cam 42 may also be utilized to allow a desirable torque characteristic over the speed range.

Although I have described only two preferred modifications of the governor and operating mechanism embodying the present invention, it will be apparent to one skilled in the art to which the invention pertains that various other changes and modifications may be made therein without departing from the spirit of the invention or the scope of the appended claims.

I claim:

1. A governor system adapted for use in an internal combustion engine having a fuel delivery means, said system comprising
    (a) a control mechanism operably connected to said fuel delivery means to selectively regulate said fuel delivery means to vary engine speed,
    (b) a variable speed governor comprising means sensing changes in said engine speed from a selected speed determined by the position of said control mechanism and means operably connected to and actuated by said sensing means,
    (c) said actuated means being operably connected to said control mechanism and being operable to regulate said fuel delivery means through said control mechanism to return the engine speed to the selected speed, and
    (d) a governor limit means operably connected to and actuated by said control mechanism to variably limit the regulation of said fuel delivery means by said actuated means.

2. The governor control system as defined in claim 1 and in which
    (a) said limit means comprises a variably positioned stop member,
    (b) said stop member being actuated by said control mechanism to assume a position which depends upon the selected speed produced by said control mechanism,
    (c) said control mechanism including an arm operably connected to said fuel delivery and means pivotally mounting said arm in a plane containing said stop member whereby pivoting of said arm regulates said fuel delivery means to vary engine speed,
    (d) said control mechanism also including means connecting said arm and said actuated means,
    (e) said actuated means being operable to pivot said arm toward and away from said stop member as engine speed increases and decreases respectively with respect to the selected speed, whereby said stop member operates to impose a variable maximum on the pivoting of said arm by said actuated means to establish for any control mechanism position a maximum engine load.

3. The governor control as defined in claim 1 and in which said limit means comprises a variable stop, said control mechanism includes a control rod connected with said fuel delivery means, said control rod having an abutment axially operable on an axis passing through said stop, and said governor being operable to move said control rod longitudinally to move said abutment toward and away from said stop relatively as engine speed increases and decreases with respect to said control mechanism operation, whereby said stop operates to impose a variable maximum on governor operation of said control rod for any control mechanism position a maximum engine load.

4. The governor control system as defined in claim 1 and in which said limit means comprises a variable stop, said control mechanism having an element movable toward said stop on operation of said system increasing engine load, the position of said stop relative to the position of said element being adjustable in response to changes in the position of said control mechanism to vary only the maximum load limit for varying positions of said control mechanism to which said governom can operate.

References Cited in the file of this patent

UNITED STATES PATENTS

| | | |
|---|---|---|
| 2,014,854 | Lothrop | Sept. 17, 1935 |
| 2,167,110 | Gutenberg et al. | July 25, 1939 |
| 2,168,232 | Messinger | Aug. 1, 1939 |
| 2,201,070 | Zintsmaster | May 14, 1940 |
| 2,230,335 | Smith | Feb. 4, 1941 |
| 2,839,287 | Evans | June 17, 1958 |
| 2,862,587 | Baughman et al. | Dec. 2, 1958 |
| 2,873,728 | Bierman | Feb. 17, 1959 |
| 2,949,957 | Eastman | Aug. 23, 1960 |

FOREIGN PATENTS

| | | |
|---|---|---|
| 418,079 | Germany | Aug. 26, 1925 |
| 1,197,319 | France | June 18, 1958 |